Figure 1:
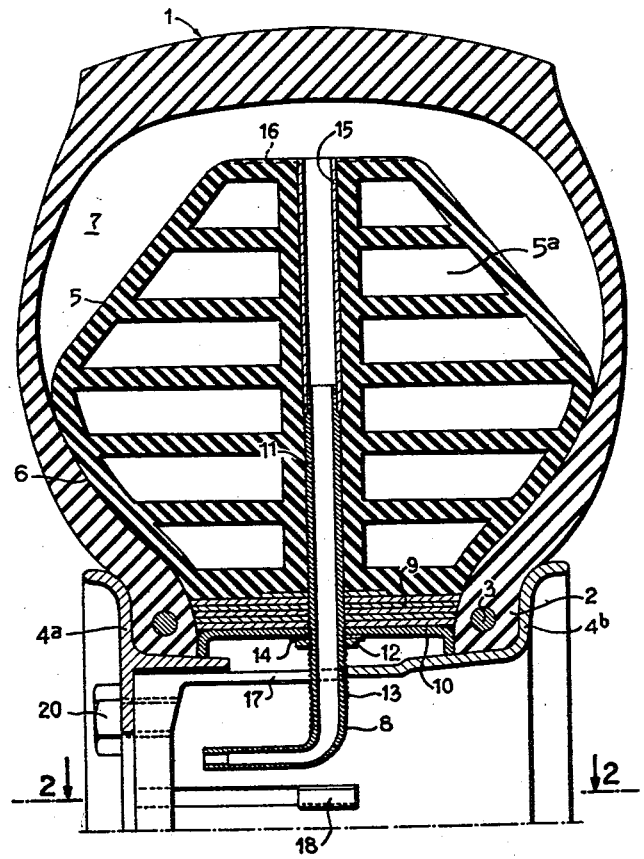

Nov. 20, 1962 F. A. RICHARD 3,064,704
PNEUMATIC ASSEMBLY FOR A VEHICLE WHEEL
Filed Aug. 1, 1961

INVENTOR,
Fabien Adrien Richard

BY Diggins + LeBlanc
ATTORNEYS

United States Patent Office 3,064,704
Patented Nov. 20, 1962

3,064,704
PNEUMATIC ASSEMBLY FOR A VEHICLE WHEEL
Fabien Adrien Richard, Persan, France, assignor to Etablissements Hutchinson (Compagnie Nationale du Caoutchouc), Paris, France, a French body corporate
Filed Aug. 1, 1961, Ser. No. 128,559
Claims priority, application France Jan. 26, 1961
9 Claims. (Cl. 152—339)

The present invention relates to pneumatic tyres for automobile or towed vehicle wheels.

The invention permits continued use of the vehicle despite a deflated tyre consecutive to a puncture by avoiding the rapid deterioration of the outer case of this pneumatic tyre.

It is known that when a tyre of conventional type has such a large puncture that it can no longer be maintained under pressure, the vehicle on which it is mounted cannot continue its route without replacing on the spot the wheel or wheels whose tyre is to be repaired. Further, it is known that a completely flat tyre involves, if the vehicle continues its route, a serious risk of the tyre slipping off the wheel rim and being destroyed.

The object of the invention is to remedy these disadvantages.

The pneumatic tyre assembly according to the invention comprises, in addition to an outer case, an annular cushion which is composed of an elastomer material, comprises independent cylindrical cavities inflated at a given pressure, and is disposed at the base of the outer case on the sides of which latter said cushion bears, thereby ensuring air-tightness of the outer case, said cushion leaving free the upper part of the outer case which latter can be inflated, through the medium of a valve extending through the cushion, at pressures regulatable in accordance with the requirements of tyre utilization.

Owing to this arrangement, the pneumatic softness or give of the tyre assembly—ensured by the pressure of the air which is introduced into the outer casing and may be regulatable—remains identical to that of conventional pneumatic tyres. On the other hand, in the event of a puncture, the collapse of the outer case is limited by the annular cushion. This cushion, the softness of which is due to the gas trapped under pressure in the independent cavities, thus acts in the manner of a reserve tyre inner tube which is substantially unaffected by the punctures of the outer case. This cushion limits, in accordance with its size, the crushing of the outer case to an acceptable value so as to permit the vehicle to continue to ride along on its wheels.

Further features and advantages of the invention will be apparent from the ensuing description, with reference to the accompanying drawing to which the invention is in no way limited.

Figure 2:
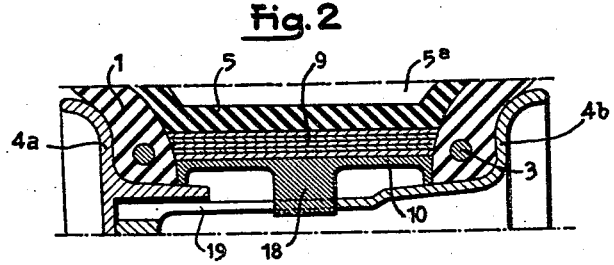

In the drawing:

FIG. 1 is a cross-sectional view of one embodiment of a pneumatic tyre assembly according to the invention in position on the rim of a wheel, and FIG. 2 is a partial sectional view taken along line 2—2 of FIG. 1.

In the illustrated embodiment, the pneumatic tyre assembly comprises an outer case 1 of construction similar to that of the outer case of conventional tyres, whose beads are reinforced by wires 3 and bear against a rim in two parts 4a and 4b.

According to the invention, a part of the inner volume of the outer case 1 is occupied by an annular cushion 5 composed of elastomer material and comprising independent cylindrical cavities 5a inflated at a given pressure. The inflated cavities 5a could be formed in accordance with a known technique such as that described in the French Patent No. 538,459 of June 25, 1921. The dimensions of the cushion 5 are such that its base bears against the side walls 6 of the outer case 1, thereby ensuring that the latter is air-tight, and forms in the upper part of the outer case an empty space 7 which can be inflated to a regulatable pressure by means of a valve 8.

The inner portion of the puncture-proof annular cushion 5 includes a reinforcement 9 which is embedded therein in the course of the vulcanization of the assembly. Further, an annular spacing member 10, which is composed of metal or rubber, reinforced or otherwise bears against the base of the cushion 5 and ensures the correct spacing between the beads 2 of the outer case 1 so as to apply them against the flanges of the two rim halves 4a and 4b. The spacing member 10 and the cushion 5 are interconnected by the valve 8 which extends through the spacing member 10 and into a transverse passageway 11 in the cushion 5. The valve 8 is held fast to the spacing member 10 by a nut 12 which is screwed on a screw-threaded part 13 of the valve, a washer 14 being inserted between the nut 12 and the spacer member 10.

It will be observed that the valve 8 does not itself extend along the entire length of the passageway 11 but is extended therein by a flexible tube 15. This arrangement ensures, in the event of a puncture, that the outer case 1 does not strike against a metal part. In order to ensure initially an easy inflation of the space 7, recesses 16 communicating with the outlet of the tube 15 are provided in the outer annular face of the cushion 5.

The spacer member 10 is prevented from rotating relative to the rim, firstly, by the valve 8 which is disposed in an opening 17 in the rim half 4b and, secondly, by lugs 18 (FIG. 2) which are equally spaced apart and protrude from the web portion of the spacing member 10 and extend into apertures 19 formed in the part 4b.

The pneumatic tyre according to the invention is mounted on the rim in the following manner:

The assembly just described is first mounted on the rim half 4b and then the rim half 4a is inserted under one of the beads 2 of the outer case 1 and urged into position by progressive clamping elements, such as screws 20, which interconnect the two halves of the rim.

In normal service the tyre is inflated by way of the valve 8, the air accumulating under pressure in the chamber 7. The volume of the latter is such as to impart to the tyre a softness or resilience identical to that of conventional tyres.

When the outer case 1 is punctured and the air escapes therefrom, the collapse of the outer case is limited by its contact with the cushion 5. The latter has such pneumatic characteristics, by virtue of the manner in which it is constructed, as to impart to the assembly such resilience as to allow the vehicle to ride on this tyre. Further, the cushion 5 maintains the beads 2 clamped against the rim and thus avoids the frequent risks of the tyre slipping off the rim in such circumstances.

Although a specific embodiment of the invention has been described, many modifications and changes may be made therein without departing from the scope of the invention as defined in the appended claims.

Having now described my invention, what I claim as new and desire to secure by Letters Patent is:

1. A pneumatic tubeless tyre assembly for a vehicle wheel having a wheel rim comprising an outer case, and a valve-less annular cushion composed of an elastomer material, said cushion comprising cavities which are permanently sealed off from each other and each contain a compressible fluid permanently trapped therein under pressure, said cushion being disposed in the part of the outer case nearest the centre of the tyre assembly and bearing on the sides of the outer case thereby ensuring that the outer case is air-tight, a free space being left between the outer part of the outer case relative to the centre of the tyre assembly and the cushion, and tyre valve means extending through the cushion for inflating said free space.

2. A pneumatic tubeless tyre assembly for a vehicle wheel having a wheel rim comprising an outer case and a valve-less annular cushion composed of an elastomer material, said cushion comprising a reinforcement in the part of the cushion nearest the centre of the tyre assembly which imparts added strength and rigidity to said part relative to the rest of the cushion and further comprising cavities which are permanently independent from each other and each contain a compressible fluid permanently trapped therein under pressure, said cushion being disposed in the part of the outer case nearest the centre of the tyre assembly and bearing on the sides of the outer case thereby ensuring that the outer case is air-tight, a free space being left between the outer part of the outer case realtive to the centre of the tyre assembly and the cushion, and tyre valve means extending through the cushion for inflating said free space.

3. A pneumatic tubeless tyre assembly for a vehicle wheel having a wheel rim comprising an outer case and beads provided on the latter and a valve-less cushion in the form of an annular member composed of elastomer material and containing independent cavities enclosing a compressible fluid under pressure, said cavities being sealed off from each other and spaced apart from each other circumferentially of the cushion and the number of said cavities being such that a puncture in one of the cavities has little effect on the cushioning effect of the cushion, said cushion being disposed in the part of the outer case nearest the centre of the tyre assembly and bearing on the sides of the outer case thereby ensuring that the outer case is air-tight, a free space being left between the outer part of the outer case relative to the centre of the tyre assembly and the cushion, tyre valve means extending through the cushion and communicating with said free space for inflating the latter, an annular spacing member applied against the cushion and inserted between said beads for holding the beads apart and applied against the flanges of the wheel rim and means connecting the spacing member to the cushion and fixing the valve in position.

4. A pneumatic tubeless tyre assembly for a vehicle wheel having a wheel rim comprising an outer case and beads provided on the latter and a valve-less annular cushion composed of an elastomer material, said cushion comprising independent cylindrical cavities which do not communicate with each other and contain a compressible fluid trapped therein under a given pressure, said cushion being disposed in the part of the outer case nearest the centre of the tyre assembly and bearing on the sides of the outer case thereby ensuring that the outer case is airtight, a free space being left between the outer part of the outer case relative to the centre of the tyre assembly and the cushion, an annular spacing member applied against the cushion and inserted between said beads for holding the beads apart and applied against the flanges of the wheel rim, lugs provided on the annular spacing member and apertures provided in the wheel rim, said lugs extending into said apertures so as to hold the spacing member stationary relative to the wheel rim.

5. A pneumatic tubeless tyre assembly as claimed in claim 1, comprising a passageway formed in the cushion into which the valve partly extends, the passageway putting said free space in communication with the valve.

6. A pneumatic tubeless tyre assembly as claimed in claim 5, comprising a flexible tube mounted in the part of the passageway through which the valve does not extend.

7. A pneumatic tubeless tyre assembly as claimed in claim 5, wherein the cushion comprises in the outer annular face thereof relative to the centre of the tyre assembly recesses which communicate with said passageway and facilitate inflation of said free space even if said outer case is initially in abutting relation to said outer face of said cushion.

8. A valveless annular cushion composed of elastomer material and comprising a passageway extending radially of the cushion and cavities which are permanently sealed off from each other and each contain a compressible fluid permanently trapped therein under pressure, said cushion being adapted to be disposed coaxially within the outer case of a pneumatic tubeless tyre on a vehicle wheel so that the cushion bears against the side walls of the outer case and the tyre valve means for inflating the outer case communicates with the latter through said passageway.

9. A vehicle wheel comprising a rim having two parts and flanges and in which rim apertures are provided combined with a pneumatic tubeless tyre assembly comprising an outer case having beads provided thereon and a valveless annular cushion composed of an elastomer material, said cushion comprises cylindrical cavities independent of each other and inflated at a given pressure and is disposed in the part of the outer case nearest the centre of the tyre assembly and bears on the sides of the outer case thereby ensuring that the outer case is air-tight, a free space being left between the outer part of the outer case relative to the centre of the tyre assembly and the cushion, tyre valve means extending through the cushion for inflating said free space, a reinforcement in the part of the cushion nearest the centre of the tyre assembly which reinforcement imparts added strength and rigidity to said part relative to the rest of the cushion, an annular spacing member applied against the reinforcement and inserted between said beads for holding the latter apart and applied against the flanges of the wheel rim, and means connecting the spacing member to the cushion and fixing the valve in position, and lugs provided on the annular spacing member, said lugs extending into said apertures so as to hold the spacing member stationary relative to the wheel rim.

References Cited in the file of this patent
UNITED STATES PATENTS 2,383,577    Zarth _____ Aug. 28, 1945

FOREIGN PATENTS 18,605    Great Britain _____ 1899
683,619    France _____ Mar. 4, 1930